United States Patent Office
3,480,387
Patented Nov. 25, 1969

3,480,387
METHOD FOR PRODUCING GYPSUM PELLETS
Yoshito Yasutake and Yosisige Fujita, Yamaguchi-ken, Japan, assignors to Central Glass Company, Ltd., Yamaguchi-ken, Japan, a corporation of Japan
No Drawing. Filed May 1, 1967, Ser. No. 634,826
Claims priority, application Japan, Nov. 15, 1966, 41/74,700
Int. Cl. C01f *11/46;* C04b *11/00*
U.S. Cl. 23—122                    5 Claims

ABSTRACT OF THE DISCLOSURE

Crystals of calcium sulfate hemihydrate produced by the so-called wet process, which are very slow to hydrate, are crushed or injured so that they have freshly exposed active surfaces, and immediately thereafter the resulting crystal granules are contacted by water. While thus effecting hydration of these crystal granules, they are pelletized so that very hard pellets of gypsum are obtained.

BACKGROUND OF THE INVENTION

Field of the invention

The present invention relates to a method for pelletizing gypsum or moulding gypsum, and more particularly to a method for pelletizing gypsum while hydrating wet process calcium sulfate hemihydrate to transfer it into gypsum. Wet process calcium sulfate hemihydrate is produced by subjecting gypsum to wet dehydration in an aqueous solution of acids including sulphuric acid and/or phosphoric acid and/or salts including sodium chloride, calcium chloride and ammonium sulphate.

Description of the prior art

It is known to produce pellets of gypsum by adding water to calcium sulfate hemihydrate obtained by the dry process and thereby hardening the latter so that the formed pellets of gypsum may be used as a retarding agent for cement. However, the manufacture of hard pellets of gypsum from wet process calcium sulfate hemihydrate involved the following problems.

As is known well, calcium sulfate hemihydrate, which is prepared by the wet process having adhering water is unstable at room temperature, being liable to transfer into gypsum during filtering and washing with water, and thus develops congelation at various sites of the apparatus including the filtering cloth and narrow spaces in the filtering apparatus.

After extensive research conducted to eliminate the foregoing difficulties encountered in the production of pellets of gypsum, the inventors have developed, as is disclosed in their co-pending U.S. patent application Ser. No. 622,452 a novel process for manufacturing stable calcium sulfate hemihydrate by having phosphoric acid dissolved, in the state of solid solution, in the calcium sulfate hemihydrate crystals. However, calcium sulfate hemihydrate which is produced by this method is stable and requires a considerably lengthy period of time, when left at room temperature, before it transfers into gypsum. This also holds true for stabilized calcium sulfate hemihydrate produced by other methods, for example, by the addition of a stabilizing agent. Accordingly, when it is desired to produce pellets of calcium sulfate from gypsum hemihydrate by utilizing its property of solidifying when hydrated into gypsum, namely, when it is desired to obtain products of gypsum either in the form of solidified, firm ball-like pellets or in other forms, the following difficulties are always encountered.

For example, when the aforesaid calcium sulfate hemihydrate has water added thereto for transforming calcium sulfate hemihydrate into gypsum and is then subjected to compression-moulding or is subjected to pelletization by rolling in a rotary pelletizing apparatus of a cylindrical or dish type for industrial use, it is found that there is usually a difference between the amount of water which is adequate for pelletizing the calcium sulfate hemihydrate and the amount of water necessary for transforming the hemihydrate into gypsum, the extent of the difference varying with the shape and the nature of the hemihydrate used. This discrepancy results in either an excess or deficiency of water within the formed pellets.

When there is an excess of water in the pellets, the surplus amount of water collects in the spaces or pores present within individual pellets and hampers the formation of densely bonded, hard pellets having an intensive mechanical strength. When there is a shortage of water, the formed individual pellets of gypsum will contain residual calcium sulfate hemihydrate which has not yet transformed into gypsum on account of the shortage of water necessary for crystallization of gypsum, and the presence of this residual calcium sulfate hemihydrate within individual pellets is not desirable when they are actually used. Moreover, due to the fact that the aforesaid wet process calcium sulfate hemihydrate is very slow in transferring into gypsum as has been described above, most of the pellets of gypsum which are discharged from the pelletizing apparatus are still not solidified sufficiently yet, irrespective of whether the pellets contain an excess amount of water or there is a shortage of water in the pellets. Such pellets retain their shape simply by dint of the adhering force of the water located in the spaces which are present within individual pellets. Thus, the pellets discharged from the pelletizing apparatus are extremely brittle and provide tremendous difficulty in their handling or transporting. Furthermore, these pellets gradually become solidified only after a lapse of a considerable length of time. As a result, the pellets which are dumped in the storage area become firmly adhered to each other and present a conglomerate condition such as that of the millet cake or a big cluster of grapes.

SUMMARY OF THE INVENTION

After extensive research to find a means to obtain pellets of gypsum having a mechanical strength sufficient for being used as an additive in cement clinkers and also to eliminate the aforesaid difficulties inherent to pellets of gypsum of the prior art, the inventors have discovered the following method of treatment with which solidified, hard pellets of gypsum can be obtained. Specifically, the present invention has been developed based on the finding that, while calcium sulfate hemihydrate produced by the wet process hydrates slowly and does not become easily solidified and congealed, it becomes quite unstable when the faces of the crystals are damaged or when the crystals are pulverized by the application thereto of appropriate vibration, impact or friction such as tapping, crushing or grinding, and the resulting calcium sulfate hemihydrate quickly becomes hydrated when contacted by water thus transforming into gypsum. Such change is believed to be caused by the fact that fresh active faces of the crystals of calcium sulfate hemihydrate are exposed as the result of the destruction of the crystals. In conjunction with the foregoing discovery, it has been also found that when fresh faces of crystals of gypsum, originating from calcium sulfate hemihydrate, are exposed as the result of the destruction of the gypsum crystals or damage to the faces of such crystals by tapping or crushing or grinding these crystals, those fresh active faces of crystals are then bestowed with an extremely enriched activity, and the crystals can then be made to grow into crystals of gypsum at an increased rate. It has also been found that by intimately mixing such activated gypsum with the calcium sulfate hemihydrate, there resulted a marked increase in the speed of transformation of calcium sulfate hemihydrate into gypsum. It has further been found to be effective for the process of the present invention to intimately mix, during the pelletizing step, gypsum and calcium sulfate hemihydrate, both of which have been activated according to the aforesaid method, while rolling them together in a rotary pelletizing apparatus.

A detailed description of the process of the present invention will now be given.

First, a quantity of calcium sulfate hemihydrate, after having dehydrated and washed with water, is carefully transported to a pelletizing apparatus so that destruction of the crystals of the calcium sulfate hemihydrate is avoided as far as possible. Such transportation may be carried out satisfactorily by the use of known ordinary industrial transportation means such as a belt conveyor, which does not impart intensive vibration and does not cause impacts between the articles being transported. The calcium sulfate hemihydrate is ground or compressed or is subjected to impact to destroy or damage the crystals so as to obtain exposed fresh faces of crystals either prior to being introduced into the pelletizing apparatus or after being introduced into the pelletizing apparatus. Immediately after such preliminary treatment, the pulverized or damaged calcium sulfate hemihydrate crystals are subjected to a pelletizing operation or moulding operation. It is also possible to put glass or porcelain or steel balls in the pelletizing apparatus so that calcium sulfate hemihydrate is pelletized at the same time as the crystals are being destroyed or damaged.

During the aforesaid step, one may introduce gypsum, which has been pulverized, into the pulverized or damaged calcium sulfate hemihydrate crystals so as to be mixed intimately and thoroughly with the latter, in the pelletizing apparatus.

The aforesaid operation will be hereunder described in further detail. Into a rotary pelletizing apparatus of the type comprising a cylindrical or conical or dish shaped drum adapted to pelletize powder-form calcium sulfate hemihydrate and containing in said apparatus a large quantity of seed pellets or crystals of calcium sulfate which have, either partially or considerably, transformed into calcium sulfate dihydrate, is introduced a quantity of calcium sulfate hemihydrate. The seed pellets or crystals and the charge of calcium sulfate hemihydrate are then mixed together while being rolled in the rotating apparatus, and thus pellets are formed as the drum rotates.

The optimal water content in the pelletizing apparatus is in the range of about 19 to 30 parts by weight per 100 parts by weight of dry calcium sulfate hemihydrate contained in the apparatus.

In order to attain this range of water content, the calcium sulfate hemihydrate may initially have moisture added thereto so that the water content of the pellets contained in the pelletizing apparatus may be maintained in the aforesaid desired range. Alternatively water may be sprinkled or introduced into the pelletizing apparatus to thereby control the water content within the pelletizing apparatus. During this step, one may add to the water the following additives: a pH regulating agent such as acid or alkali for reforming the property of the formed pellets, a reinforcement agent for increasing the mechanical strength of the pellets, a hardening accelerator such as potassium chloride and Glauber's salt for appropriately controlling the hardening rate of the calcium sulfate hemihydrate, a retarding agent such as alkali including sodium carbonate, phosphate, a pelletization accelerator such as sodium lignin sulphonate, or other extending agent. Also, one may directly introduce these additives into the pelletizing apparatus or may indirectly use them by mixing them with the recycled calcium sulfate hemihydrate or recycled gypsum or the charge of calcium sulfate hemihydrate.

The calcium sulfate hemihydrate or the gypsum crystals resulting from the transformation of calcium sulfate hemihydrate may be damaged or destroyed prior to being introduced into a pelletizing apparatus by the use of an apparatus designed for imparting friction, vibration or impact to its contents. Thereafter, the pulverized or damaged crystals are mixed as quickly as possible with the seed pellets. Also, one may use a pelletizing apparatus equipped with a scraper, a hammering means, crushing rollers, or one may introduce balls into the pelletizing apparatus, so that the calcium sulfate hemihydrate or gypsum, which is being pelletized, is concurrently locally pulverized, rubbed or ground to expose fresh active faces of the crystal granules and at the same time the crystals having exposed fresh active faces are deposited on the surfaces of the seed pellets while being stirred by a scraper.

A portion of the resulting mixture of calcium sulfate hemihydrate and gypsum, which is being pelletized, is withdrawn from the pelletizing apparatus and is recycled into the pelletizing apparatus after pulverizing the mixture by a crushing apparatus, to be dispersed and mixed in the contents of the pelletizing apparatus, or a portion of the formed pellets discharged from the pelletizing apparatus is pulverized in a crushing apparatus and thereafter recycled to the pelletizing apparatus to be mixed with the contents. By employing these techniques either individually or in arbitrary combination, pellets are discharged from the pelletizing apparatus in the form of sufficiently solidified pellets which have almost completely transformed from calcium sulfate hemihydrate into gypsum and which contain very little residual water.

PREFERRED EMBODIMENTS OF THE INVENTION

EXAMPLE 1

To a quantity of wet process calcium sulfate hemihydrate which has been described above as being one that does not quickly transform into gypsum, was added about 0.8% by weight of CaO in the form of diluted milk of lime having a concentration of 4% for controlling the pH of the product. At the same time, the water content of the resulting mixture was controlled so as to be 19.1%, based on dried calcium sulfate hemihydrate. Thus, 1.5 kg. of starting stock was prepared. This stock was divided into two lots. One of them was ground in a grinder for 2 minutes. Immediately thereafter, the ground stock was mixed with the other lot and the mixture was introduced into a pelletizing apparatus. The pelletizing apparatus used was of the rotary cylindrical type having a diameter of 25 cm. and a length of 65 cm. and was rotated at the speed of 60 r.p.m. In about 3 minutes after the mixture was introduced into the pelletizing apparatus, the mixture was rolled into globular pellets having smooth surfaces and being 5 to 6 mm. in diameter. At the same time, slight hardening of the pellets started. About 8 minutes after the mixture was introduced into the pelletizing apparatus, hadening of the pellets was almost completed and the formed pellets were withdrawn therefrom. One hour later following the withdrawal, the amount of calcium sulfate hemihydrate remaining in the formed pellets was determined by X-ray diffraction, with the result that substantially no residual gypsum hemihydrate was detected. The formed pellets were then placed between two plates and compression force was applied thereto to determine the mean compressive strength of the pellets. The compressive strength of the pellets was 3.6 kg. at the end of 8 minutes after the start of the pelletizing operation, while it was 20 kg. or more at the end of 1 hour. Thus, pellets having an intensive hardness and containing substantially no residual calcium sulfate hemihydrate were obtained.

CONTROL EXAMPLE

To the same calcium sulfate hemihydrate as that used in Example 1 was added diluted milk of lime, and the water content was adjusted to 19.1%, by weight. The mixture was introduced immediately into a pelletizing apparatus, without first grinding the starting stock in a grinding apparatus, and pelletized. The stock did not become solidified at the end of 1 hour, and the formed pellets had a slightly excess water content and were obtained in the form of dumplings of 20 to 40 mm. in diameter. There was noted a tremendous adherence of calcium sulfate hemihydrate and gypsum onto the inner wall of the apparatus.

EXAMPLE 2

A tapered pan type rotary pelletizing apparatus having a diameter of 1 m. and a depth of 30 cm. and equipped with a movable scraper and a roller-type pulverizing means adapted to crush gypsum located in the pan, was rotated at a speed of about 35 to 40 r.p.m. Calcium sulfate hemihydrate containing 14% by weight of water was supplied from the top of the tapered pan at the rate of 250 kg. per hour.

30 to 50 kg. of pellets which were being pelletized in the pan and which consisted of a mixture of large sized and small sized pellets, were left in the pan as the seed pellets. The calcium sulfate hemihydrate was introduced into the pan containing said seed pellets, and the introduced calcium sulfate hemihydrate was immediately dispersed and mixed with the seed pellets by means of the scraper.

Water was sprayed onto the seed pellets so that water content of the pellets was 20 to 23% by weight of the dry calcium sulfate hemihydrate base. The seed pellets located in the pan were lifted along the side wall of the tapered pan as the pan was rotated and, then the seed pellets dropped onto the bottom plate and thus the pellets repeated this circulation movement in the pan. A portion of the seed pellets dropping down onto the bottom plate were collected by doctors and led away from the bottom plate to a location where the seed pellets consisting of crystals of calcium sulfate hemihydrate and gypsum were crushed by crushing rollers. Thereafter the crushed seed pellets were returned to the tapered pan there to become mixed with the uncrushed seed pellets. As the result of the operation conducted in the manner described, globular pellets having smooth surfaces and having a diameter ranging from 15 to 20 mm. were discharged from the pelletizing apparatus. These individual pellets were firmly solidified even immediately after being discharged from the pelletizing apparatus, and hardly any residual calcium sulfate hemihydrate was present in the individual pellets, being observable only in an appreciable degree by X-ray diffraction test.

CONTROL EXAMPLE

A quantity of calcium sulfate hemihydrate was supplied to an apparatus similar to that used in Example 2 but not equipped with rollers adapted to crush crystals of gypsum. Pelletization was performed while controlling the water content to 20 to 23%. The result was that only a very small amount of calcium sulfate hemihydrate transferred into gypsum, and that the formed pellets contained an excess amount of water. A large amount of soft calcium sulfate hemihydrate and gypsum adhered to the internal face of the pan, and the gypsum was discharged in a large mass, thus making further continuation of pelletizing operation impossible.

EXAMPLE 3

A tapered rotary pan-type pelletizing apparatus having a diameter of 1 m. and a depth of 30 cm. was rotated at the speed of 30 r.p.m. About 50 to 80 kg. of seed pellets of calcium sulfate which have, either partially or in a greater part, transformed into gypsum, were placed in the pelletizing apparatus. While rotating the pan, to these seed pellets was supplied calcium sulfate hemihydrate at the rate of 500 kg. per hour, said calcium sulfate hemihydrate being such as has been described previously, i.e., one having a water content controlled to 24% and having a very slow ability of transforming into gypsum. From the area in the pan-type pelletizing apparatus in which growing pellets having somewhat small diameters drop onto the bottom plate were collected such growing pellets at the rate of 80 to 300 kg. per hour, and they were then damaged with a hammer crusher and returned to the pelletizing apparatus after being mixed with fresh calcium sulfate hemihydrate by means of a small size paddle mixer.

Thus, hard globular pellets of 15 to 20 mm. in diameter, which have almost completely transformed into gypsum, were obtained from the pelletizing apparatus.

What is claimed is:

1. A method for producing gypsum pellets from calcium sulfate hemihydrate crystals which are slow to transform into gypsum and which are obtained as a by-product of a process for producing wet process phosphoric acid, comprising the steps of:

subjecting said hemihydrate crystals to a mechanical crystal-damaging action to damage the crystals and thereby expose fresh active faces on the crystals;

mixing the damaged crystals with a further quantity of undamaged crystals and with water to form a pelletizable mixture, and subjecting the mixture to pelletization in a pelletizing apparatus while transforming the hemihydrate crystals into gypsum whereby to obtain dense, hard, non-brittle gypsum pellets substantially free of hemihydrate and containing little residual water.

2. A method for producing gypsum pellets according to claim 1, in which the pelletizable mixture contains from about 19% to about 30% by weight of water, based on the weight of the mixture calculated as calcium sulfate hemihydrate.

3. A method according to claim 1, including the further step subjecting seed crystals of gypsum to a mechanical crystal-damaging action to damage said gypsum seed crystals and thereby expose fresh active faces on said seed crystals and mixing said damaged seed crystals in said pelletizable mixture.

4. A method according to claim 3, including the step removing a portion of the mixture undergoing pelletization from the pelletizing apparatus, subjecting said portion to a mechanical crystal-damaging action to damage the crystals contained in said portion and thereby expose fresh active faces on said crystals and then returning said portion to said pelletizing apparatus and mixing it with said pelletizable mixture therein.

5. A method according to claim 1, in which the pelletizable mixture also contains milk of lime as a pH regulating agent.

References Cited

UNITED STATES PATENTS

| | | | |
|---|---|---|---|
| 1,973,473 | 9/1934 | Edwards | 23—122 |
| 2,044,942 | 6/1936 | Heckert | 23—122 |
| 2,177,254 | 10/1939 | Heckert | 23—122 |
| 2,207,416 | 7/1940 | Ryan et al. | 23—122 |
| 3,262,799 | 7/1966 | McCleary et al. | 106—110 |
| 3,326,635 | 6/1967 | Davenport | 23—122 X |
| 3,359,146 | 12/1967 | Lane | 106—110 |

OSCAR R. VERTIZ, Primary Examiner

G. O. PETERS, Assistant Examiner

U.S. Cl. X.R.

106—109